US009900740B2

(12) United States Patent
Pandian

(10) Patent No.: US 9,900,740 B2
(45) Date of Patent: Feb. 20, 2018

(54) AMBIENT RF ENERGY GEOMAPPING SYSTEM

(71) Applicant: Vikram Ilangkadhir Pandian, Breinigsville, PA (US)

(72) Inventor: Vikram Ilangkadhir Pandian, Breinigsville, PA (US)

(*) Notice: Subject to any disclaimer, the term of this patent is extended or adjusted under 35 U.S.C. 154(b) by 0 days.

(21) Appl. No.: 15/465,565

(22) Filed: Mar. 21, 2017

(65) Prior Publication Data
US 2017/0280282 A1 Sep. 28, 2017

Related U.S. Application Data

(60) Provisional application No. 62/311,884, filed on Mar. 22, 2016.

(51) Int. Cl.
*H04W 24/00* (2009.01)
*H04W 4/02* (2018.01)
*H04W 4/00* (2018.01)
*H04L 29/08* (2006.01)

(52) U.S. Cl.
CPC .............. *H04W 4/02* (2013.01); *H04L 67/18* (2013.01); *H04W 4/008* (2013.01)

(58) Field of Classification Search
CPC .......... H04W 4/02; H04W 4/008; H04L 67/18
See application file for complete search history.

(56) References Cited

U.S. PATENT DOCUMENTS

| | | | |
|---|---|---|---|
| 9,787,103 B1* | 10/2017 | Leabman | H02J 5/005 |
| 2013/0324059 A1* | 12/2013 | Lee | H04W 52/02 455/127.1 |
| 2016/0099602 A1* | 4/2016 | Leabman | H02J 7/025 307/104 |
| 2016/0249317 A1* | 8/2016 | Legrain | H04W 64/00 |
| 2016/0254698 A1* | 9/2016 | Anderson | H01M 10/465 320/101 |
| 2017/0110887 A1* | 4/2017 | Bell | H02J 5/005 |
| 2017/0223499 A1* | 8/2017 | Jernigan | H04W 4/021 |
| 2017/0238241 A1* | 8/2017 | Sydir | H04W 48/16 455/434 |

* cited by examiner

Primary Examiner — Ajit Patel

(57) ABSTRACT

The objective is to find the amount of ambient RF energy available in a given location to power battery free products. This was achieved by designing and building a novel, handheld, low cost, system to capture the ambient RF signal (such as cellular signals, TV broadcasting waves, and WiFi signals), convert to DC power level that can be harvested at any given location, and visually GeoMap it using the GPS coordinates. The constructed hardware portion of the system consists of the Arduino microcontroller, the RF Power Detector chip, wideband antenna, and Bluetooth Module. The Arduino is programmed to capture the RF Power data from the RF Power Detector chip and send it to the Mobile Application. The developed Android App is able to communicate with the Arduino via Bluetooth and receive the captured RF Power data from it. The data is uploaded to the web server along with GPS coordinates. The created website stores the uploaded data from the app to the online database. This data is then GeoMapped, which visually represents the geographical areas having the various RF Power levels with different graded colors shown as a heat map.

9 Claims, 3 Drawing Sheets

Figure 1:
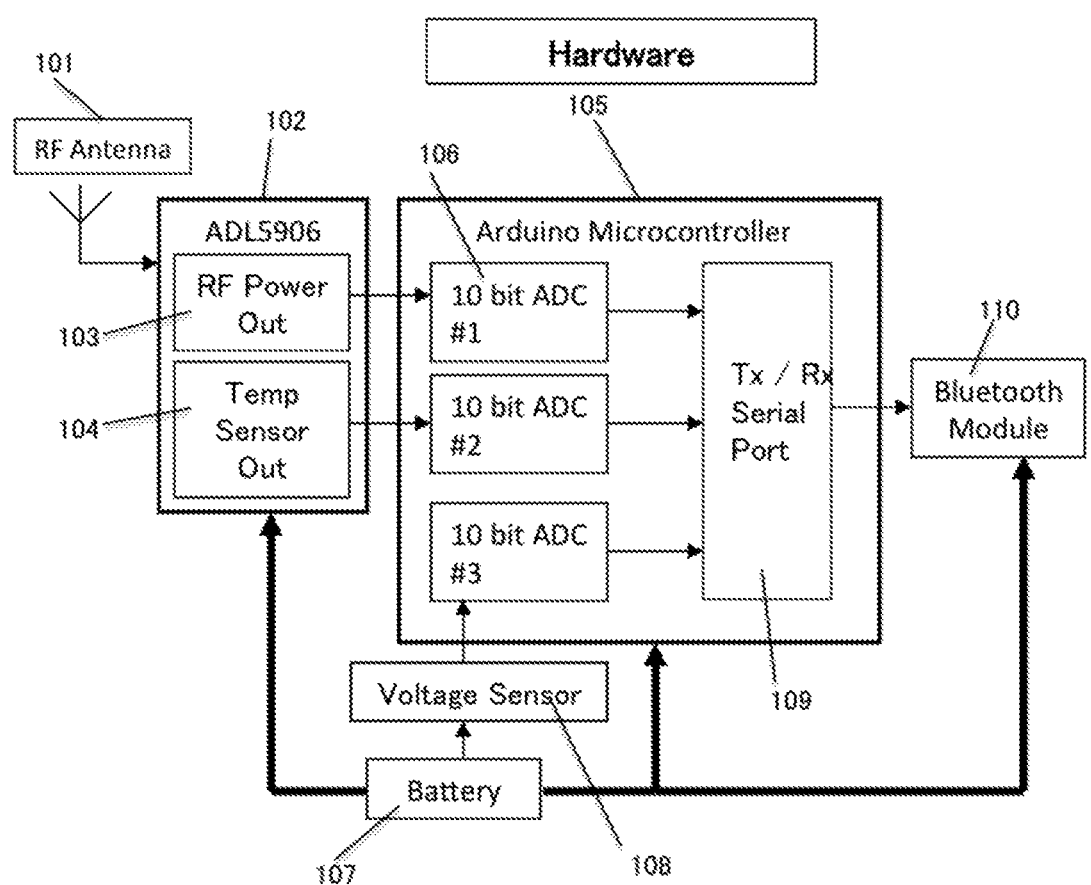

ABMIENT RF ENERGY GEOMAPPING
SYSTEM

BACKGROUND

The embodiments herein consists of a handheld, low cost system, which can capture ambient signals, convert to power level, and GeoMap Ambient Radio Frequency (RF) Energy and any transduceable physical phenomena using appropriate transducers. This system can be directed towards collecting data and GeoMapping it through the process of crowdsourcing.

Instrumentation for a single user to collect RF data exists such as in U.S. Pat. No. 2011/011,5605 to Dimig and Salah (2011). This system focuses on an RF antenna positioned in a vehicle to receive transmitted signals, which is then used to power a key fob. The excess electrical energy is stored. While this can harvest the RF energy present, it is unable to determine how much actually exists in a given area.

Both U.S. Pat. No. 8,552,597 B2 to Song and Sastry (2007) and U.S. Pat. No. 2009/0152,954 A1 to Le, Flez, and Mayaram (2009) are specialized circuit designs that are used to harvest RF energy. These circuits contain capacitors that are able to store collected RF energy for later use. Song and Sastry claim "harvesting radio frequency energy using a crystal receiver" and Le, Flez, and Mayaram claim using a "voltage double rectifier" which are both examples of extra features to an RF harvest circuit. With both of these, the circuits are primarily to be integrated in applications for RF systems such as a wireless sensor network. Therefore, they should not be considered standalone systems that can be used by the general public, but rather improvements to circuit designs in already existing applications.

In conclusion, of what I am aware, there is no formerly developed system that is able to report the Ambient RF Energy level by displaying the data through an online GeoMap that can be accessed by the general public.

SUMMARY

A low cost handheld system to capture the Ambient RF signal, convert to RF power level, and transmit to a Smartphone device which can display and upload this data to an online server that renders a Heatmap style GeoMap has been created. In one embodiment, the system consists of three parts:
1. The hardware portion, which encompasses the handheld Arduino device with RF Antenna and ADL5906 Chip that captures and converts RF signal to power level digital code.
2. The Android Application that interacts with the Arduino device to process, display, and store the RF energy data
3. An online webserver that holds a database of RF energy values and creates a Heatmap style GeoMap that anyone can view.

In other embodiments, extension to this system is to accommodate the capturing, converting, and mapping of any transduceable physical phenomenon with any smartphone platform.

The system is distributed which enables use of low cost dedicated hardware while using the GPS, data communication, and processing power of a smartphone that everyone has. The primary advantage of this system is the method in which data will be collected: crowdsourcing. This system is simple to use, low cost, and fully automated for data collection so that through the process of crowdsourcing many users of the system will capture and upload RF energy data at various geographical locations with effortless ease. Then, researchers and companies who are developing battery free sensors will be able to easily access the RF energy data of their targeted geographical location, which they can use to optimize their devices.

DRAWINGS

FIG. 1. "Hardware" is a block diagram of one embodiment that shows the Hardware portion of the Ambient RF Energy GeoMap system.

Figure 2:
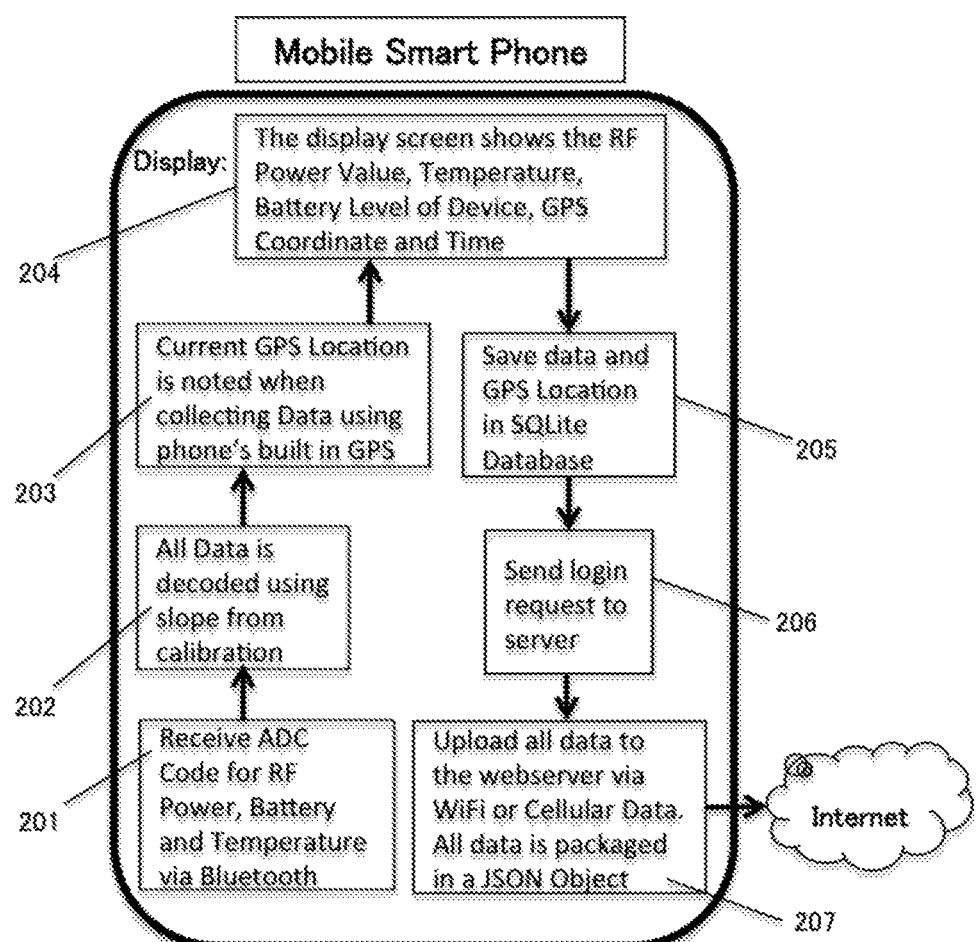

FIG. 2. "Mobile Smartphone" is a block diagram of one embodiment that portrays the functions of the Android Mobile Application.

Figure 3:
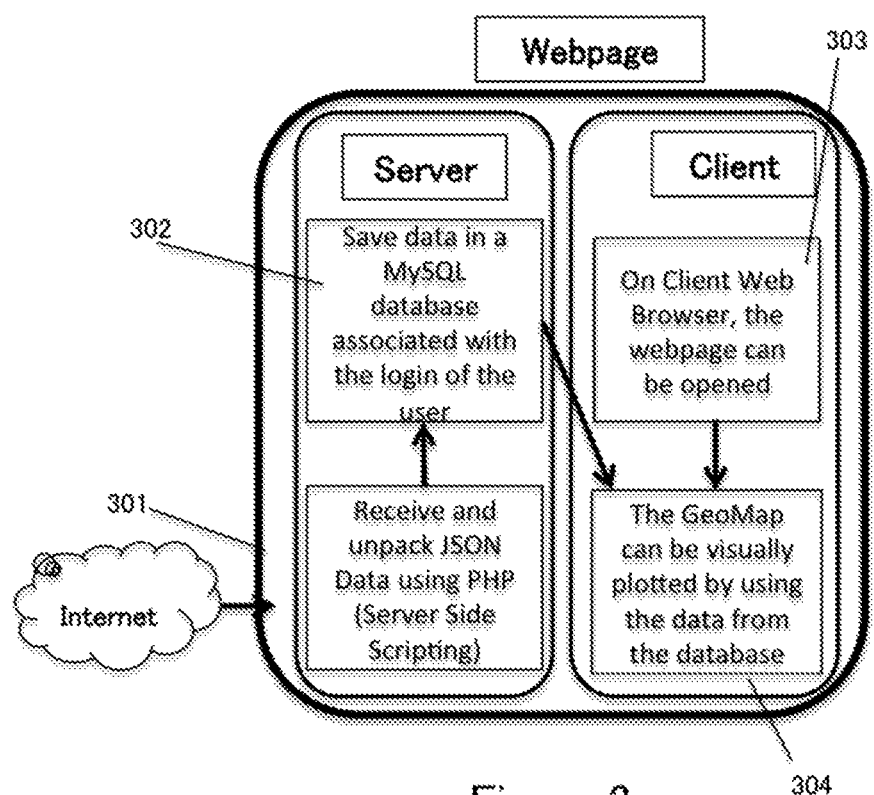

FIG. 3. "Webpage" is a block diagram of one embodiment of the online webserver, which stores RF data and creates a Heatmap style GeoMap using the information.

DETAILED DESCRIPTION

A prototype to capture the Radio Frequency (RF) signal, convert to power level, and GeoMap The Ambient RF Energy is described here. A GeoMap is a map of a country, continent, or region, with colors and values assigned to specific regions. Values in this prototype represent captured RF power at any given location and are displayed as a color scale. The map is rendered in the web browser using an embedded Flash player. This graphical way of representing values as colors is also known as a HeatMap. RF waves occupy the range of 300 MHz to 6 GHz in the electromagnetic spectrum. RF waves are emitted from sources such as cellphones, base stations towers, Televisions and Wi-Fi Routers, to name a few. One embodiment is about how to capture the RF signal, convert to power level, store this power level value, and GeoMap this freely available RF power that is everywhere. Power, which is energy per unit time, is calculated in dBm (decibel milliwatts, 0 dBm=1 mW). Harvesting free RF energy is a hot research topic today; Ultra-low power battery free products are emerging and the need for high efficiency RF harvesting circuits is growing. But, vital information on how much RF energy is present at a given geographical location and whether such energy is enough to power battery free applications is missing. One embodiment attempts to provide that missing piece to enable researchers to refine power specifications of their new products.

FIG. 1. shows the Hardware portion. An Omnidirectional Antenna 101, such as the one from manufacturer Taoglas, is used to capture the ambient RF energy and convert it into an alternating current (AC) electrical signal. An RF power detector chip, such as the one from manufacturer Analog Devices (ADL5906) 102, is used to convert this AC signal into a direct current (DC) signal 103 and transmit it to an Arduino Board. Arduino 105 is a scalable microcontroller module that can be programmed to interact with other circuit blocks to control and extract data from them. Arduino provide sets of digital and analog I/O pins that can be interfaced to various expansion boards and other circuits. The boards feature serial communications interfaces 109 for loading programs and to communicate with other computing devices such as personal computers and cellular phones. Along with RF power information, the RF power detector chip is also used to obtain the ambient temperature level 104 in the area, which is also transmitted to the Arduino Board. The Arduino is able to then convert these two signals from Analog to Digital domain using 2 of the 3 built in 10-bit A to D Converters (ADC) 106. Now, the converted and encoded RF Power data and temperature data are sent to the newly developed Android Application via a Bluetooth Module 110. The battery level of the Arduino's external battery pack 107 is also transmitted to the Android Application, using a voltage sensor 108 that is connected to the third ADC. Transmitting the obtained temperature data is useful for identifying any RF power data dependencies to ambient temperature. Transmitting battery power level is useful so that the Arduino can be instructed to stop capturing RF signal when battery power is low.

The section labeled "Mobile Smart Phone" in FIG. 2 explains Android Application (App) portion. In one embodiment the newly developed Android App is executed on an Android operating system based cellular phone. (Apps for other mobile platforms can be readily developed based on these design principles.) The App communicates with the Bluetooth Module on the Arduino Board and receives RF power, temperature and battery level ADC code through mobile device Bluetooth interface 201 and converts those coded values into the actual physical values i.e convert 10 bit coded numbers to RF power level in dBm, Temperature in Degrees Celsius/Fahrenheit and Battery Level in Volts. The conversion of coded values to physical values is accomplished using the slope found during the calibration of the device 202. Calibration procedure involves sending a known RF signal using an RF signal generator at different known power levels through the Arduino system and plotting the obtained ADC code against the known RF power level. Plotting different known power levels versus different ADC codes results in a straight line, whose slope can then be used to translate any ADC code to a real physical power level of the RF signal being captured. Similarly, ADCs can be calibrated for translating ADC codes to temperature and voltage. Using the smart cellular phone's built in Location Services feature, the GPS location of the phone 203 at the instant a data point is received from the Arduino is also recorded. Using the App, the display screen of the phone 204 shows the RF Power Value, Temperature, Battery Level of Device, GPS Coordinate and the Time. The app then enables the user to save the displayed data in SQLite Database using phone's memory 205. After the data is saved, the data can be uploaded to the webserver. To do this, the user must first login on the Application 206. If the login is valid, the data is then packaged into a JSON object 207 and sent via wifi or cellular data to the server. JSON stands for JavaScript Object Notation, which is syntax for storing and exchanging data.

When the Arduino captures the RF signal, the cellular phone's radios are temporarily turned off to capture only the available ambient power. Finding Ambient RF power in a given area is as easy as walking or driving the hardware around in an automobile and turning on the App in the cell phone. To avoid logging the same data again and again at a fixed location, the App has features to obtain and receive data only when the GPS location has significantly changed (for example 10 meters) from the previously recorded location. The App has a Settings page where this value and other options can be modified.

The section labeled "Webpage" in FIG. 3. explains the website portion of one of the embodiment herein. The server receives the uploaded data from the mobile device and unpacks the JSON Object, which is accomplished by a newly developed PHP (Hypertext PreProcessor) script 301. PHP is a popular general-purpose server side scripting language that is especially suited to advanced web development. The unpacked data is saved to a MYSQL database 302 associated with the login information of the user. Now, when a client opens up the website on their web browser 303, the GeoMap will be rendered. The GeoMap takes the data from the MySQL database and plots it on a HeatMap style layout 304 using Google Map API's (Application Program Interfaces).

REFERENCE NUMERALS

101 RF Omnidirectional Antenna
102 ADL5906 Chip
103 RF Power Output (on ADL5906)
104 Temperature Sensor Output (on ADL5906)
105 Arduino Microcontroller
106 10 Bit Analog to Digital Converter (×3) (on Arduino)
107 External Battery
108 Voltage Sensor (on Arduino)
109 Transmitting and Receiving Serial Ports (on Arduino)
110 Bluetooth Module (on Arduino)
201 Receive ADC Code for RF Power, Temperature, and Battery Level
202 Data Decoding using Calibration Slope
203 GPS Location from Smartphone Location Services
204 Smart Phone Display shows RF Power Value, GPS Location, Temperature, Battery
205 SQLite Database on Android Smartphone that Stores GPS and RF Data
206 Webserver Login Request
207 JSON Object with Packaged Data to be Sent to Webserver Via Wifi
301 PHP (Server Side Scripting) to unpack JSON Object
302 MySQL Database with all data on Webserver
303 Webpage on Client Web Browser
304 GeoMap with RF data in a Heat Map style layout

OPERATION

In operation one uses the system when an RF signal or any transduceable physical phenomena needs to be GeoMapped. The user can carry the handheld system and complete the following steps:

1. Power up Arduino device with the RF Antenna 101, ADL5906 Chip 102, and Bluetooth Module 110 (FIG. 1. "Hardware") and prepare to pair with Android Smartphone Device.
2. Open Android Mobile Application (FIG. 2. "Mobile Smart Phone") and connect to the Arduino device via Bluetooth.
3. Begin data collection by interacting with the Display of the Android Mobile Application and walking or driving around to collect data at various geographical locations. RF data and GPS Location data will be stored in an SQLite Database on the Smartphone Device
4. Via Wifi or cellular data, connect to the Internet and upload the SQLite Database contents to the online webserver (FIG. 3. "Webpage Server"). An account can be made to store an individual user's RF data and uploads on a MYSQL database with PHP.
5. View the website on an Internet Web browser (FIG. 3. "Webpage Client") and see the visual GeoMap that is created using Google Map API and the data from the user's MYSQL database. The RF data is visualized in a Heatmap style layout.

The invention claimed is:

1. An Ambient RF Energy GeoMapping System, comprising:
   an antenna for capturing RF energy and converting said RF energy into an alternating current (AC) electrical signal;

a first processor connected to the said antenna for receiving the said AC electrical signal and converting into direct current (DC) signal, wherein said first processor also obtaining an ambient temperature level signal at any location;

a second processor for receiving said DC signal, said ambient temperature level signal, and battery level signal and converting into encoded RF power data, temperature data and battery level data using Analog to Digital converter and send to a mobile computing device via a wireless module;

an application software running on the said mobile computing device that can process, store and display the said encoded RF power data, said temperature data and said battery level data into physical values and upload these said physical values along with GPS information to a webserver;

said webserver to create an interactive graded geographic map representing that said RF energy at any given location.

2. The Ambient RF Energy GeoMapping System of claim 1, wherein said antenna is an omnidirectional antenna.

3. The Ambient RF Energy GeoMapping System of claim 1, wherein said first processor is an RF power detector chip.

4. The Ambient RF Energy GeoMapping System of claim 1, wherein said second processor is an Arduino microcontroller.

5. The Ambient RF Energy GeoMapping System of claim 1, wherein said wireless module is a Bluetooth module.

6. The Ambient RF Energy GeoMapping System of claim 1, wherein the said mobile computing device is a cellular phone.

7. The Ambient RF Energy GeoMapping System of claim 1, wherein said application software is an Android mobile application.

8. The Ambient RF Energy GeoMapping System of claim 1, wherein said webserver asks for login credentials to validate users before accepting said data.

9. The Ambient RF Energy GeoMapping System of claim 1, wherein said interactive graded geographic map is Heat-Map style layout using Google Map API.

* * * * *